United States Patent [19]

Karne et al.

[11] Patent Number: 5,133,077
[45] Date of Patent: Jul. 21, 1992

[54] DATA PROCESSOR HAVING MULTIPLE EXECUTION UNITS FOR PROCESSING PLURAL CLASSS OF INSTRUCTIONS IN PARALLEL

[75] Inventors: Ramesh K. Karne; Sastry S. Vedula, both of Herndon

[73] Assignee: International Business Machines Corporation, Armonk, N.Y.

[21] Appl. No.: 534,004

[22] Filed: Jun. 5, 1990

Related U.S. Application Data

[63] Continuation of Ser. No. 109,656, Oct. 19, 1987, abandoned.

[51] Int. Cl.⁵ .............................................. G06F 13/00
[52] U.S. Cl. ............................. 395/800; 364/DIG. 1; 364/DIG. 2; 364/229; 364/230
[58] Field of Search ... 364/200 MS File, 900 MS File; 395/800

[56] References Cited

U.S. PATENT DOCUMENTS

| | | | |
|---|---|---|---|
| 3,247,488 | 4/1966 | Welsh et al. | 364/200 |
| 3,346,851 | 10/1967 | Thornton | 364/200 |
| 3,629,853 | 12/1971 | Newton | 364/200 |
| 4,041,461 | 8/1977 | Kratz et al. | 364/200 |
| 4,149,243 | 4/1979 | Wallace | 364/200 |
| 4,251,861 | 2/1981 | Mago | 364/200 |
| 4,251,864 | 2/1981 | Kindell et al. | 364/200 |
| 4,272,828 | 6/1981 | Negi et al. | 364/900 |
| 4,338,661 | 7/1982 | Tredennick et al. | 364/200 |
| 4,399,507 | 8/1983 | Cosgrove et al. | 364/200 |
| 4,404,628 | 9/1983 | Angelo | 364/200 |
| 4,428,048 | 1/1984 | Berlin, Jr. | 364/200 |
| 4,438,492 | 3/1984 | Harmon, Jr. et al. | 364/200 |
| 4,443,848 | 4/1984 | Gehman | 364/200 |
| 4,466,061 | 8/1984 | DeSantis et al. | 364/200 |
| 4,547,849 | 10/1985 | Louie et al. | 364/200 |
| 4,558,411 | 12/1985 | Faber et al. | 364/200 |
| 4,594,651 | 6/1986 | Jaswa et al. | 364/131 |
| 4,594,660 | 6/1986 | Guenthner et al. | 364/200 |
| 4,620,275 | 10/1986 | Wallach et al. | 364/200 |
| 4,622,631 | 11/1986 | Frank et al. | 364/200 |
| 4,680,701 | 7/1987 | Cochran | 364/200 |
| 4,760,519 | 7/1988 | Papworth et al. | 364/200 |

OTHER PUBLICATIONS

"Control Method of Instruction Handling in a Microprocessor Having Multiple Execution Units," K. Tamaru, Systems-Computers-Controls, vol. 14, No. 5, 1983, pp. 88-96.

Primary Examiner—David Y. Eng
Assistant Examiner—Robert B. Harrell
Attorney, Agent, or Firm—Mark A. Wurm; John E. Hoel

[57] ABSTRACT

A data processor is disclosed which enables the selective simultaneous or asynchronous execution of mutually independent instructions of different classes in parallel coupled execution units and which enables the sequential execution of mutually dependent instructions of different classes by delaying the execution of a dependent instruction in a second execution unit until the completion of execution of a precursor instruction in a first execution unit. The instructions are dispatched to respective ones of a plurality of parallel coupled execution units, in accordance with their instruction class.

7 Claims, 22 Drawing Sheets

FEUs: Overall Architecture

FEU Diagram: A Typical Interface

FIG. 4

Execution unit Control Vectors:  Example 1

| OPD1_ID | OPD2_ID | RESULT_ID | ADDRESS | |
|---|---|---|---|---|
| 35 | 36 | 37 | 2000 | Instruction 1 |
| 17 | 36 | 17 | 4000 | Instruction 2 |
| 27 | 17 | 17 | FFFF | Instruction 3 |
| 17 | 17 | 17 | FFFF | Instruction 4 |

FIG. 6

FEU5: Timing Diagram Contd..

```
CYCLES
1   2   3   4   5   6   7   8   9   10  11  12  13  14  15  16  17
─────────────────────────────────────────────────────────────────────

FEU_CNTL_N
|   |   |───|───|───|───|   |   |   |   |   |   |   |   |   |   |
    FEU 5   1   3   6

GT_SRC_9
|   |   |   |───|   |   |   |   |   |   |   |   |   |   |   |   |

OPD_REG9_V
|   |   |   |   |───|───|   |   |   |   |   |   |   |   |   |   |

GT_SRC_10
|   |   |   |   |───|   |   |   |   |   |   |   |   |   |   |   |

OPD_REG10_V
|   |   |   |   |   |───|   |   |   |   |   |   |   |   |   |   |

FEU5_EX
|   |   |   |   |   |───|   |   |   |   |   |   |   |   |   |   |

RESULT_REG5
|   |   |   |   |   |   |───|   |   |   |   |   |   |   |   |   |

RESULT_V_5
|   |   |   |   |   |   |───|   |   |   |   |   |   |   |   |   |

GT_ST_BFR_WR
|   |   |   |   |   |   |───|   |   |   |   |   |   |   |   |   |

ST_BFR_ADR
|   |   |   |   |   |   |───|   |   |   |   |   |   |   |   |   |

RESULT_REG_RST_5
|   |   |   |   |   |   |·──|   |   |   |   |   |   |   |   |   |
```

FEU6: Timing Diagram

IDISP: Detailed Diagram

Source & Result select Logic: FEU Control

Store Buffer Select Logic: FEU Control

FIG. 13

Instruction MAP: FEU and OPD MAPPING

| OPcode | Mnemonic | ADDR TYPE | OPD1 | OPD2 | RESULT | SRC1SE | SRC2SE | FEU |
|---|---|---|---|---|---|---|---|---|
| 48,49 | XIO,VIO | IM,IMX | 36 | 35 | 38-47 | 2 | 5 | 8 |
| 51 | SBR | R | 35 | 17 | 17 | 5 | 1 | 5 |
| 50 | SB | D,DX | 35 | 36 | 36 | 5 | 2 | 5 |
| 52 | SBI | I,IX | 35 | 36 | 36 | 5 | 2 | 5 |
| 54 | RBR | R | 35 | 17 | 17 | 5 | 1 | 5 |
| 53 | RB | D,DX | 35 | 36 | 36 | 5 | 2 | 5 |
| 55 | RBI | I,IX | 35 | 36 | 36 | 5 | 2 | 5 |
| 57 | TBR | R | 35 | 17 | 17 | 5 | 1 | 5 |
| 56 | TB | D,DX | 35 | 36 | 36 | 5 | 2 | 5 |
| 58 | TBI | I,IX | 35 | 36 | 36 | 5 | 2 | 5 |
| 59 | TSB | D,DX | 35 | 36 | 36 | 5 | 2 | 5 |
| 5A | SVBR | R | 17 | 17 | 17 | 1 | 2 | 5 |
| 5C | RVBR | R | 17 | 17 | 17 | 1 | 2 | 5 |
| 5E | TVBR | R | 17 | 17 | 17 | 1 | 2 | 5 |
| 60 | SLL | R | 17 | 35 | 17 | 5 | 1 | 5 |
| 61 | SRL | R | 17 | 35 | 17 | 5 | 1 | 5 |
| 62 | SRA | R | 17 | 35 | 17 | 5 | 1 | 5 |
| 63 | SLC | R | 17 | 35 | 17 | 5 | 1 | 5 |
| 65 | DSLL | R | 17 | 35 | 17 | 5 | 1 | 5 |
| 66 | DSRL | R | 17 | 35 | 17 | 5 | 1 | 5 |
| 67 | DSRA | R | 17 | 35 | 17 | 5 | 1 | 5 |
| 68 | DSLC | R | 17 | 35 | 17 | 5 | 1 | 5 |

FIG. 14

Instruction MAP: FEU and OPD MAPPING

| OPcode | Mnemonic | ADDR TYPE | OPD1 | OPD2 | RESULT | SRC1SE | SRC2SE | FEU |
|---|---|---|---|---|---|---|---|---|
| 6A | SLR | R | 17 | 17 | 17 | 1 | 1 | 5 |
| 6B | SAR | R | 17 | 17 | 17 | 1 | 1 | 5 |
| 6C | SCR | R | 17 | 17 | 17 | 1 | 1 | 5 |
| 6D | DSLR | R | 17 | 17 | 17 | 1 | 1 | 5 |
| 6D | DSLR | R | 17 | 17 | 17 | 1 | 1 | 5 |
| 6E | DSAR | R | 17 | 17 | 17 | 1 | 1 | 5 |
| 6F | DSCR | R | 17 | 17 | 17 | 1 | 1 | 5 |
| 70 | JC | D,DX | — | — | — | — | — | 8 |
| 71 | JCI | I,IX | — | — | — | — | — | 8 |
| 72 | JS | D,DX | — | — | — | — | — | 8 |
| 73 | SOJ | D,DX | — | — | — | — | — | 8 |
| 74 | BR | ICR | — | — | — | — | — | 8 |
| 75 | BEZ | ICR | — | — | — | — | — | 8 |
| 76 | BLT | ICR | — | — | — | — | — | 8 |
| 77 | BEX | S | — | — | — | — | — | 8 |
| 78 | BLE | ICR | — | — | — | — | — | 8 |
| 79 | BGT | ICR | — | — | — | — | — | 8 |
| 7A | BNZ | ICR | — | — | — | — | — | 8 |
| 7B | BGE | ICR | — | — | — | — | — | 8 |
| 7D | LST | D,DX | 36 | — | 48 | 2 | — | 1 |
| 7C | LSTI | I,IX | 36 | — | 48 | 2 | — | 1 |
| 7E | SJS | D,DX | 17 | 17 | 17 | 1 | 5 | 8 |

FIG. 15

Instruction MAP: FEU and OPD MAPPING

| OPcode | Mnemonic | ADDR TYPE | OPD1 | OPD2 | RESULT | SRC1SE | SRC2SE | FEU |
|--------|----------|-----------|------|------|--------|--------|--------|-----|
| 7F | URS | S | 17 | — | 17 | 1 | — | 8 |
| 81 | LR | R | 17 | — | 17 | 1 | — | 1 |
| 00 | LB | B | 36 | — | 17 | 2 | — | 1 |
| 400 | LBX | BX | 36 | — | 17 | 2 | — | 1 |
| 82 | LISP | ISP | 35 | — | 17 | 5 | — | 1 |
| 83 | LISN | ISN | 35 | — | 17 | 5 | — | 1 |
| 80 | L | D,DX | 36 | — | 17 | 2 | — | 1 |
| 85 | LIM | IM,IMX | 35 | — | 17 | 5 | — | 1 |
| 84 | LI | I,IX | 36 | — | 17 | 2 | — | 1 |
| 87 | DLR | R | 17 | — | 17 | 1 | — | 8 |
| 01 | DLB | B | 36 | — | 17 | 2 | — | 1 |
| 401 | DLBX | BX | 36 | — | 17 | 2 | — | 1 |
| 86 | DL | D,DX | 36 | — | 17 | 2 | — | 1 |
| 88 | DLI | I,IX | 36 | — | 17 | 2 | — | 1 |
| 89 | LM | D,DX | 36 | — | 49 | 2 | — | 1 |

FIG. 16

Instruction MAP: FEU and OPD MAPPING

| OPcode | Mnemonic | ADDR TYPE | OPD1 | OPD2 | RESULT | SRC1SE | SRC2SE | FEU |
|---|---|---|---|---|---|---|---|---|
| 8A | EFL | D,DX | 36 | — | 17 | 2 | — | 1 |
| 8B | LUB | D,DX | 36 | — | 17 | 2 | — | 5 |
| 8D | LUBI | I,IX | 36 | — | 17 | 2 | — | 5 |
| 8C | LLB | D,DX | 36 | — | 17 | 2 | — | 5 |
| 8E | LLBI | I,IX | 36 | — | 17 | 2 | — | 5 |
| 8F | POM | S | 36 | — | 50 | 2 | — | 1 |
| 02 | STB | B | 17 | — | 37 | 2 | — | 2 |
| 402 | STBX | BX | 17 | — | 37 | 2 | — | 2 |
| 90 | ST | D,DX | 17 | — | 37 | 2 | — | 2 |
| 94 | STI | I,IX | 17 | — | 37 | 2 | — | 2 |
| 91 | STC | D,DX | 35 | — | 37 | 5 | — | 2 |
| 92 | STCI | I,IX | 35 | — | 37 | 5 | — | 2 |
| 93 | MOV | S | 36 | — | 37 | 2 | — | 8 |
| 03 | DSTB | B | 17 | — | 37 | 2 | — | 2 |
| 403 | DSTX | BX | 17 | — | 37 | 2 | — | 2 |
| 96 | DST | D,DX | 17 | — | 37 | 2 | — | 2 |
| 98 | DSTI | I,IX | 17 | — | 37 | 2 | — | 2 |
| 97 | SRM | D,DX | 17 | 36 | 37 | 1 | 2 | 5 |
| 99 | STM | D,DX | 17 | — | 51 | 1 | — | 8 |
| 9A | EFST | D,DX | 17 | — | 37 | 2 | — | 2 |
| 9B | STUB | D,DX | 17 | — | 37 | 1 | — | 5 |
| 9D | SUBI | I,IX | 17 | — | 37 | 1 | — | 5 |

FIG. 17

Instruction MAP: FEU and OPD MAPPING

| OPcode | Mnemonic | ADDR TYPE | OPD1 | OPD2 | RESULT | SRC1SE | SRC2SE | FEU |
|---|---|---|---|---|---|---|---|---|
| 9C | STLB | D,DX | 17 | — | 37 | 1 | — | 5 |
| 9E | STBI | I,IX | 17 | — | 37 | 1 | — | 5 |
| 9F | PSHM | S | 17 | — | 51 | 1 | — | 2 |
| A1 | AR | R | 17 | 17 | 17 | 1 | 1 | 3 |
| 10 | AB | B | 17 | 36 | 17 | 1 | 2 | 3 |
| 404 | ABX | BX | 17 | 36 | 17 | 1 | 2 | 3 |
| A2 | AISP | ISP | 17 | 35 | 17 | 1 | 5 | 3 |
| A0 | A | D,DX | 17 | 36 | 17 | 1 | 2 | 3 |
| 4A1 | AIM | IM | 17 | 35 | 17 | 1 | 5 | 3 |
| A3 | INCM | D,DX | 35 | 36 | 37 | 5 | 2 | 3 |
| A4 | ABS | R | 17 | 17 | 17 | 1 | 1 | 3 |
| A5 | DABS | R | 17 | 17 | 17 | 1 | 1 | 3 |
| A7 | DAR | R | 17 | 17 | 17 | 1 | 1 | 3 |
| A6 | DA | D,DX | 17 | 36 | 17 | 1 | 2 | 3 |
| A9 | FAR | R | 17 | 17 | 17 | 1 | 1 | 4 |
| 20 | FAB | B | 17 | 36 | 17 | 1 | 2 | 4 |
| 408 | FABX | BX | 17 | 36 | 17 | 1 | 2 | 4 |
| A8 | FA | D,DX | 17 | 36 | 17 | 1 | 2 | 4 |
| AB | EFAR | R | 17 | 17 | 17 | 1 | 1 | 4 |
| AA | EFA | D,DX | 17 | 36 | 17 | 1 | 2 | 4 |
| AC | FABS | R | 17 | 17 | 17 | 1 | 1 | 4 |
| B1 | SR | R | 17 | 17 | 17 | 1 | 1 | 3 |

FIG. 18

Instruction MAP:  FEU and OPD MAPPING

| OPcode | Mnemonic | ADDR TYPE | OPD1 | OPD2 | RESULT | ST-MEM | ST-REG | FEU |
|--------|----------|-----------|------|------|--------|--------|--------|-----|
| OPcode | Mnemonic | ADDR TYPE | OPD1 | OPD2 | RESULT | SRC1SE | SRC2SE | FEU |
| 405 | SBBX | BX | 17 | 36 | 17 | 1 | 2 | 3 |
| B2 | SISP | ISP | 17 | 35 | 17 | 1 | 5 | 3 |
| B0 | S | D,DX | 17 | 36 | 17 | 1 | 2 | 3 |
| 4A | SIM | IM | 17 | 35 | 17 | 1 | 5 | 3 |
| B3 | DECM | D,DX | 35 | 36 | 37 | 5 | 2 | 3 |
| B5 | DNEG | R | 17 | 17 | 17 | 1 | 1 | 3 |
| B7 | DSR | R | 17 | 17 | 17 | 1 | 1 | 3 |
| B6 | DS | D,DX | 17 | 36 | 17 | 1 | 2 | 3 |
| B9 | FSR | R | 17 | 17 | 17 | 1 | 1 | 4 |
| 21 | FSB | B | 17 | 36 | 17 | 1 | 2 | 4 |
| 409 | FSBX | BX | 17 | 36 | 17 | 1 | 2 | 4 |
| B8 | FS | D,DX | 17 | 36 | 17 | 1 | 2 | 4 |
| BB | EFSR | R | 17 | 17 | 17 | 1 | 1 | 4 |
| BA | EFS | D,DX | 17 | 36 | 17 | 1 | 1 | 4 |
| BC | FNEG | R | 17 | 17 | 17 | 1 | 1 | 4 |
| C1 | MSR | R | 17 | 17 | 17 | 1 | 1 | 6 |
| C2 | MISP | ISP | 17 | 35 | 17 | 1 | 5 | 6 |
| C3 | MISN | ISN | 17 | 35 | 17 | 1 | 5 | 6 |
| C0 | MS | D,DX | 17 | 36 | 17 | 1 | 2 | 6 |
| 4A | MSIM | IM | 17 | 35 | 17 | 1 | 5 | 6 |
| C5 | MR | R | 17 | 17 | 17 | 1 | 1 | 6 |

FIG. 19

Instruction MAP: FEU and OPD MAPPING

| OPcode | Mnemonic | ADDR TYPE | OPD1 | OPD2 | RESULT | SRC1SE | SRC2SE | FEU |
|---|---|---|---|---|---|---|---|---|
| 12 | MB | B | 17 | 36 | 17 | 1 | 2 | 6 |
| 406 | MBX | BX | 17 | 36 | 17 | 1 | 2 | 6 |
| C4 | M | D,DX | 17 | 36 | 17 | 1 | 2 | 6 |
| 4A3 | MIM | IM | 17 | 35 | 17 | 1 | 5 | 6 |
| C7 | DMR | R | 17 | 17 | 17 | 1 | 1 | 7 |
| C6 | DM | D,DX | 17 | 36 | 17 | 1 | 2 | 7 |
| C9 | FMR | R | 17 | 17 | 17 | 1 | 1 | 6 |
| 22 | FMB | B | 17 | 36 | 17 | 1 | 2 | 6 |
| 40A | FMBX | BX | 17 | 36 | 17 | 1 | 2 | 6 |
| C8 | FM | D,DX | 17 | 36 | 17 | 1 | 2 | 6 |
| CB | EFMR | R | 17 | 17 | 17 | 1 | 1 | 6 |
| CA | EFM | D,DX | 17 | 36 | 17 | 1 | 2 | 6 |
| D1 | DVR | R | 17 | 17 | 17 | 1 | 1 | 7 |
| D2 | DISP | ISP | 17 | 35 | 17 | 1 | 5 | 7 |
| D3 | DISN | ISN | 17 | 35 | 17 | 1 | 5 | 7 |
| D0 | DV | D,DX | 17 | 36 | 17 | 1 | 2 | 7 |
| 4A6 | DVIM | IM | 17 | 35 | 17 | 1 | 5 | 7 |
| D5 | DR | R | 17 | 17 | 17 | 1 | 1 | 7 |
| 13 | DB | B | 17 | 36 | 17 | 1 | 2 | 7 |
| 407 | DBX | BX | 17 | 36 | 17 | 1 | 2 | 7 |
| D4 | D | D,DX | 17 | 36 | 17 | 1 | 2 | 7 |
| 4A5 | DIM | IM | 17 | 35 | 17 | 1 | 2 | 7 |

FIG. 20

Instruction MAP: FEU and OPD MAPPING

| OPcode | Mnemonic | ADDR TYPE | OPD1 | OPD2 | RESULT | SRC1SE | SRC2SE | FEU |
|---|---|---|---|---|---|---|---|---|
| D7 | DDR | R | 17 | 17 | 17 | 1 | 1 | 7 |
| D6 | DD | D,DX | 17 | 36 | 17 | 1 | 2 | 7 |
| D9 | FDR | R | 17 | 17 | 17 | 1 | 1 | 7 |
| 23 | FDB | B | 17 | 36 | 17 | 1 | 2 | 7 |
| 40B | FDBX | BX | 17 | 36 | 17 | 1 | 2 | 7 |
| D8 | FD | D,DX | 17 | 36 | 17 | 1 | 2 | 7 |
| DB | EFDR | R | 17 | 17 | 17 | 1 | 1 | 7 |
| DA | EFD | D,DX | 17 | 36 | 17 | 1 | 2 | 7 |
| E1 | ORR | R | 17 | 17 | 17 | 1 | 1 | 5 |
| 30 | ORB | B | 17 | 36 | 17 | 1 | 2 | 5 |
| 40F | ORBX | BX | 17 | 36 | 17 | 1 | 1 | 5 |
| E0 | OR | D,DX | 17 | 36 | 17 | 1 | 2 | 5 |
| 4A8 | ORIM | IM | 17 | 35 | 17 | 1 | 5 | 5 |
| E3 | ANDR | R | 17 | 17 | 17 | 1 | 1 | 5 |
| 31 | ANDB | B | 17 | 36 | 17 | 1 | 2 | 5 |
| 40E | ANDX | BX | 17 | 36 | 17 | 1 | 2 | 5 |
| E2 | AND | D,DX | 17 | 36 | 17 | 1 | 2 | 5 |
| 4A7 | ANDM | IM | 17 | 35 | 17 | 1 | 5 | 5 |
| E5 | XORR | R | 17 | 17 | 17 | 1 | 1 | 5 |
| E4 | XOR | D,DX | 17 | 36 | 17 | 1 | 2 | 5 |
| 4A | XORM | IM | 17 | 35 | 17 | 1 | 5 | 5 |
| E7 | NR | R | 17 | 17 | 17 | 1 | 1 | 5 |

FIG. 21

Instruction MAP: FEU and OPD MAPPING

| OPcode | Mnemonic | ADDR TYPE | OPD1 | OPD2 | RESULT | SRC1SE | SRC2SE | FEU |
|---|---|---|---|---|---|---|---|---|
| E6 | N | D,DX | 17 | 36 | 17 | 1 | 2 | 5 |
| 4A | NIM | IM | 17 | 35 | 17 | 1 | 5 | 5 |
| E8 | FIX | R | 17 | | | | | 8 |
| E9 | FLT | R | 17 | | | | | 8 |
| EA | EFIX | R | 17 | | | | | 8 |
| EB | EFLT | R | 17 | | | | | 8 |
| EC | XBR | S | 17 | 17 | 17 | 1 | 1 | 5 |
| ED | XWR | R | 17 | 17 | 17 | 1 | 1 | 5 |
| F1 | CR | R | 17 | 17 | — | 1 | 1 | 3 |
| 32 | CB | B | 17 | 36 | — | 1 | 2 | 3 |
| 40C | CBX | BX | 17 | 36 | — | 1 | 2 | 3 |
| F2 | CISP | ISP | 17 | 35 | — | 1 | 5 | 3 |
| F3 | CISN | ISN | 17 | 35 | — | 1 | 5 | 3 |
| F0 | C | D,DX | 17 | 36 | — | 1 | 2 | 3 |
| 4AA | CIM | IM | 17 | 35 | — | 1 | 5 | 3 |
| F4 | CBL | D,DX | | | | | | 8 |
| F7 | DCR | R | 17 | 17 | — | 1 | 1 | 3 |
| F6 | DC | D,DX | 17 | 36 | — | 1 | 2 | 3 |
| F9 | FCR | R | 17 | 17 | — | 1 | 1 | 3 |
| 33 | FCB | B | 17 | 36 | — | 1 | 2 | 3 |
| 40D | FCBX | BX | 17 | 36 | — | 1 | 2 | 3 |

FIG. 22

Instruction MAP: FEU and OPD MAPPING

| OPcode | Mnemonic | ADDR TYPE | OPD1 | OPD2 | RESULT | SRC1SE | SRC2SE | FEU |
|---|---|---|---|---|---|---|---|---|
| F8 | FC | D,DX | 17 | 36 | — | 1 | 2 | 3 |
| FB | EFCR | R | 17 | 17 | — | 1 | 1 | 3 |
| FA | EFC | D,DX | 17 | 36 | — | 1 | 2 | 3 |
| FF00 | NOP | S | — | — | — | — | — | 8 |
| FFFF | BPT | S | — | — | — | — | — | 8 |

DATA PROCESSOR HAVING MULTIPLE EXECUTION UNITS FOR PROCESSING PLURAL CLASSS OF INSTRUCTIONS IN PARALLEL

This application is a continuation of U.S. patent application Ser. No. 07/109,656, filed Oct. 19, 1987, which is now abandoned.

BACKGROUND OF THE INVENTION

1. Technical Field

The invention disclosed broadly relates to data processing and more particularly relates to data processing apparatus and methods employing multiple execution units.

2. Background Art

The typical vonNeuman type computer carries out a time sequential execution of a linear sequence of instructions, where the single execution unit devotes its full time and attention to the execution of the current instruction, obtaining the result thereof before commencing the execution of the next sequential instruction. Advances have been made in the prior art to perform at least a partial execution of a next instruction while the execution of a current instruction is being completed. For example, U.S. Pat. No. 3,629,853 to Newton, assigned to IBM Corporation, provides for overlapping the memory fetch operation of a next instruction with the execution of an existing instruction. This concept of overlapped execution of sequential instructions is carried further in the U.S. Pat. No. 4,399,507 to Cosgrove, et al., assigned to IBM Corporation, wherein a instruction execution pipeline is created with four stages which are instruction fetch, data store address generation, data storage control, and arithmetic logic execution. Other techniques for speeding up the sequential execution of an instruction stream can be performed for those tasks which have highly repetitive subtasks such as in digital signal processing, where parallel execution units can be programmed to carry out simultaneous and identical operations on different blocks of data, as for example in U.S. Pat. No. 4,041,461 to Kratz, et al., assigned to IBM Corporation. Multiprocessing networks have been proposed, as in U.S. Pat. No. 4,149,243 to Wallace, assigned to IBM Corporation, wherein several data processors operating on separate instruction streams, are interlinked and can perform mutually dependent operations, by means of post and wait logic. However, no prior art has proposed an efficient method for providing parallel execution units which operate on a single instruction stream so as to efficiently perform mutually dependent functions.

OBJECTS OF THE INVENTION

It is therefore an object of the invention to provide a more efficient data processing architecture which operates on a single instruction stream to execute instructions in diverse classes in parallel while enabling mutually dependent operations to be carried out sequentially.

SUMMARY OF THE INVENTION

The invention disclosed herein is a data processor having multiple execution units for processing plural classes of instructions in parallel. The data processing system will include a plurality of execution units which are selectively coupled to a memory and to a plurality of registers. The data processing system will process a sequence of instructions each of which includes an op code, a source location value and a result location value. The op code of each instruction is classified into one of a plurality of classes. In accordance with the invention, means are provided for executing each instruction in a corresponding one of the plurality of instruction units according to the class of the op code for the instruction.

The data processor includes an instruction dispatcher which has an input coupled to receive the sequence of instructions and an output connected to each of the plurality of execution units, for identifying the class of an op code in an instruction in the sequence and for dispatching the instruction to one of the plurality of execution units corresponding to the identified class.

The data processor further includes a control unit having an input connected to the instruction dispatcher and also having an input connected from and an output connected to each of the plurality of execution units. The control unit stores a result location specified by a first occurring instruction in the sequence which is to be executed in a first one of the plurality of execution units. The control unit compares the result location of the first occurring instruction with the source location specified by a second occurring instruction in the sequence which is to be executed in a second one of the plurality of execution units. The control unit delays the execution of the second instruction until the completion of the execution of the first instruction, if the source location matches the result location indicating that the execution of the second instruction depends on the result produced by the execution of the first instruction. Otherwise, the first instruction and the second instruction are executed simultaneously in their respective execution units.

In this manner, mutually dependent instructions of different classes can be executed in an appropriate sequential manner and other instructions which are not mutually dependent can be executed simultaneously or asynchronously in their respective execution units.

BRIEF DESCRIPTION OF THE DRAWINGS

These and other objects, features and advantages of the invention will be more fully appreciated with reference to the accompanying figures.

FIG. 4 is a diagram of the execution unit control vectors.

FIG. 6 is a further timing diagram for FEU5 in the example.

FIGS. 13, 14, 15, 16, 17, 18, 19, 20, 21, and 22 list the instruction map for the FEU control.

DESCRIPTION OF THE BEST MODE FOR CARRYING OUT THE INVENTION

Figure 1:
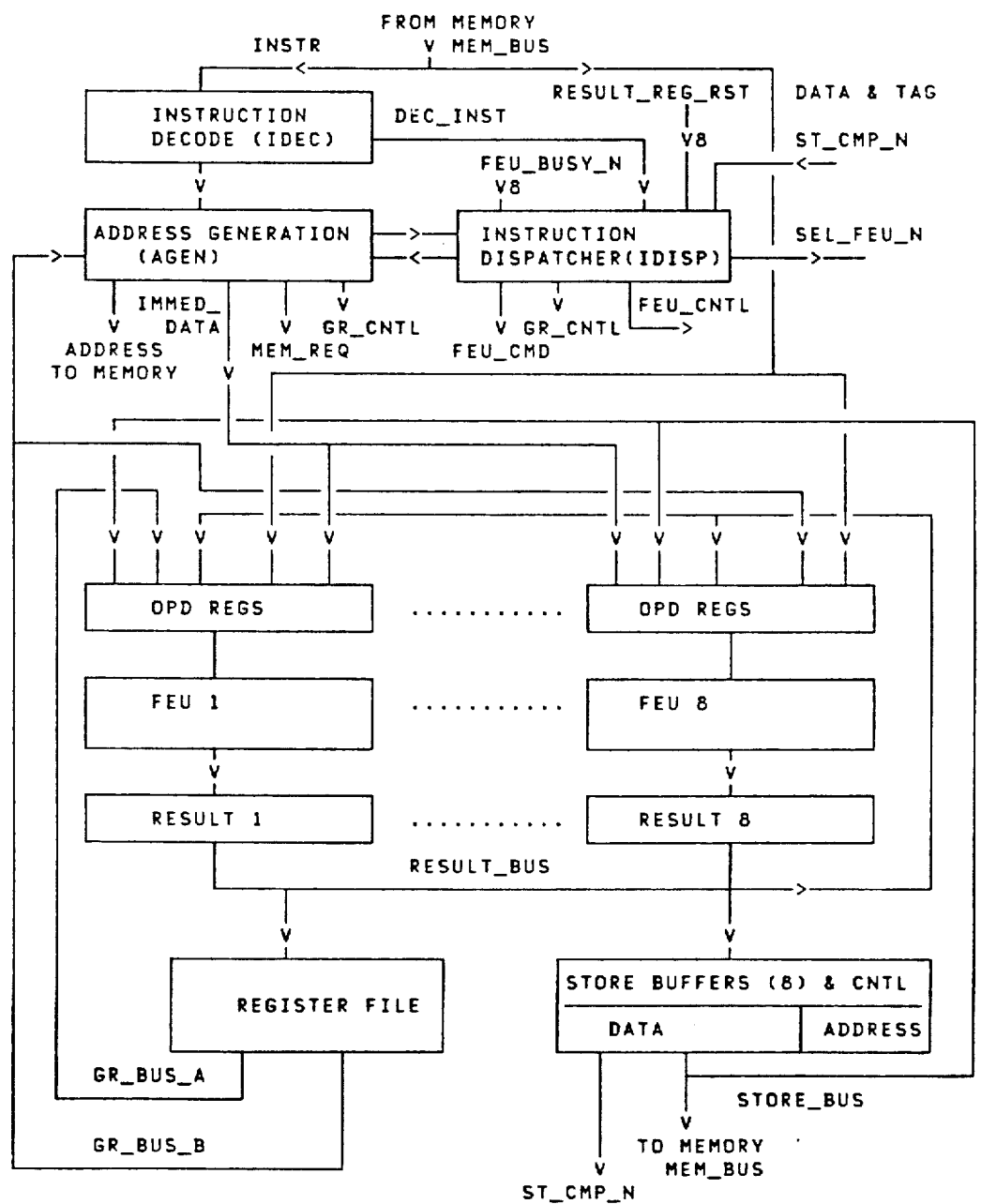
FIG. 1 is a diagram of the overall architecture of the invention.
Figure 2:
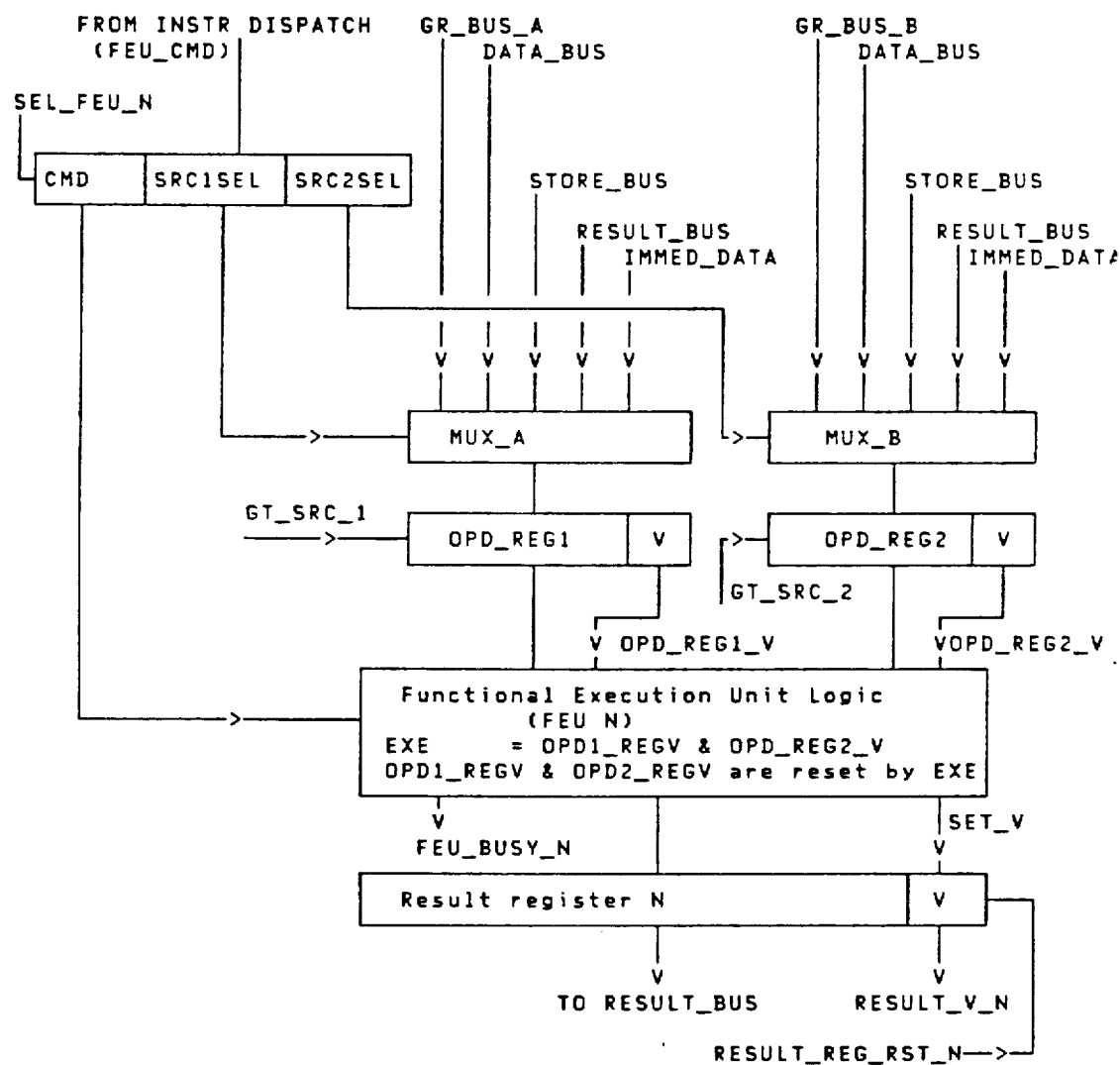
FIG. 2 is a diagram of the architecture of one of the execution units.

FIG. 1 is an architectural diagram of the data processor, showing the multiple execution units which are referred to as functional execution units FEU1 through FEU8. The architecture of a typical FEU is shown in FIG. 2. These eight execution units are capable of processing in parallel instructions from a corresponding eight different classes of instructions as will be further discussed herein. Examples of different classes of instructions include general register loading operations, memory read and write operations, arithmetic add, subtract and compare operations, branching instructions, and input/output instructions. The data processor architecture shown in FIG. 1 has a connection to a main memory through a conventional memory control unit which accepts address values from the data processor defining memory locations for reading or writing data. Associated with the data processor architecture shown in FIG. 1 can be a plurality of as many as 16 general registers which can be used for the temporary storage of data for use in the conventional manner. The instructions which are applied in a sequence to the data processor each include an op code defining the operation to be performed by the data processor, at least one source location value for operands to be processed in accordance with the op code, and at least one result location value to identify the destination of the results after the execution of the function defined by the op code.

The op code of each instruction is classified into one of a plurality of classes, in this example eight classes, each class of which corresponds to one of the execution units FEU1 through FEU8 in the data processor of FIG. 1. In accordance with the invention, the data processor is capable of executing each instruction in a corresponding one of the plurality of execution units according to the class of the op code for the instruction. Those instructions which are not mutually dependent can be executed simultaneously in their corresponding execution units. Those instructions which do have a data dependency where the result of a first instruction must be used as the operand for a second instruction, means are provided for delaying the execution of the second instruction until the result produced by the execution of the first instruction is obtained.

FIG. 1 illustrates an instruction dispatcher in the data processor which has an input coupled to receive the sequence of instructions and which has an output connected to each of the plurality of execution units FEU1 through FEU8. The instruction dispatcher identifies the class of an op code in an instruction taken from the instruction sequence. The instruction dispatcher then dispatches the instruction to one of the plurality of instruction units which corresponds to the identified class.

Figure 3:
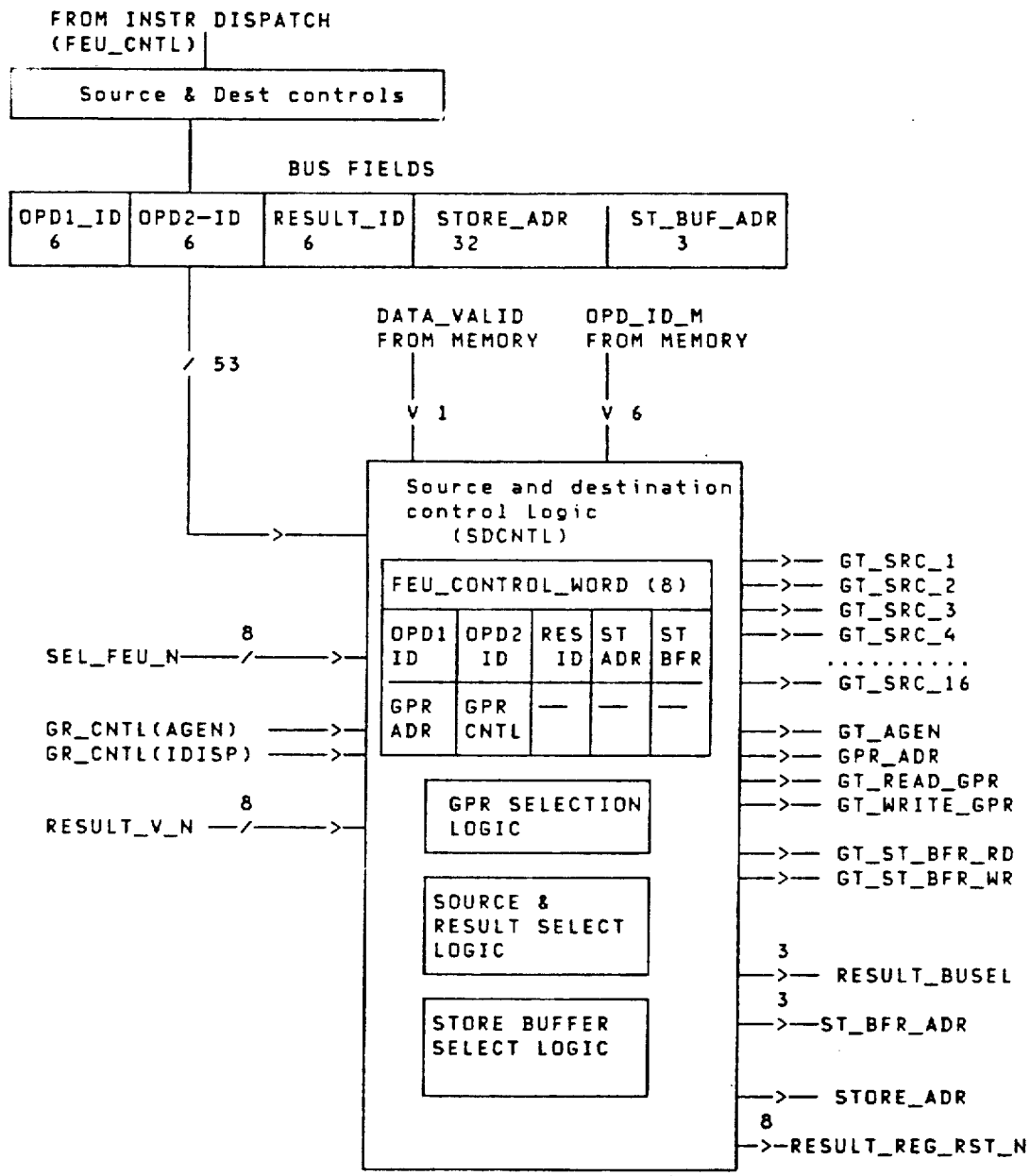
FIG. 3 is a diagram of the architecture of the control unit.

The instruction dispatcher has an output connected to the control unit which is shown in FIG. 3. The control unit has an input connected from and an output connected to each of the plurality of execution units FEU1 through FEU8. The instruction dispatcher outputs a control vector to the control unit for each execution unit which is in operation, several example control vectors being shown in FIG. 4. Each control vector includes two source location values OPD1-ID and OPD2-ID. Each control vector also includes a result location value RESULT-ID. Each control vector also includes a storage address STOR-ADR for memory accessing which may occur after the execution of the instruction.

The control unit stores a result location specified by a first occurring instruction in the sequence which is to be executed in a first one of the execution units, FEU1, for example. The control unit will then compare the result location of the first occurring instruction with the source location specified by a second occurring instruction in the instruction sequence, which is to be executed in a second one of the plurality of execution units, for example FEU2. The control unit will delay the execution of the second instruction until the completion of the execution of the first instruction, if the source location matches the result location which would indicate that the execution of the second instruction depends upon the result produced by the execution of the first instruction. Alternately, if there is no such mutual dependence between the first and the second instruction, the execution of the first instruction in the first execution unit FEU1 will occur simultaneously or asynchronously with the execution of the second instruction in the second execution unit FEU2.

In this manner, mutually dependent instructions in different classes can be executed in an appropriate sequence whereas mutually independent instructions of different classes can be executed in their respective execution units, simultaneously. This allows for a more efficient and rapid execution of the instruction stream.

DETAILED DESCRIPTION

The invention is based on a functional execution unit (FEU) concept for the CPU architecture. In the disclosed embodiment, all the data buses and address buses are 16 bits wide, but other bus widths could be employed.

The instructions and data are accessed from memory through a single memory bus (MEM_BUS) and the control lines are separate. The architecture described here is disclosed for a CPU, but it can also be applied to I/O processors or other dedicated function processors.

Instruction Decode (IDEC)

There is a single instruction stream in the disclosed architecture. The IDEC in FIG. 1 decodes the instructions until the instruction buffer has been filled in a sequential manner and then feeds each decoded instruction to the address generation unit. Once a given instruction is decoded, it never has to go through the IDEC again. The instructions can be decoded very fast, one in each cycle.

Address Generation (AGEN)

The AGEN in FIG. 1 generates all the forms of the address for the CPU. The address generation is performed every cycle, the IDEC unit feeds the instructions to the AGEN until the instruction buffer is full. The AGEN process may be repeated on the same instruction again due to a conflict that may arise in the instruction stream. The decoded instructions have a microcode address related to the instruction and this starting microcode address is stored in the AGEN, so that the address generation can be repeated later on in the stream. The AGEN logic also issues memory requests and immediate operands are sent to the FEUs.

Instruction Dispatcher (IDISP)

The IDISP unit in FIG. 1 receives the decoded instructions and addresses from the AGEN unit. The IDISP unit performs the following functions:

1. Resolves conflicts:
   Register data conflicts
   Register address conflicts
   Memory data conflicts
2. Issues commands to FEUs.
   IDISP unit will issue a command to an appropriate FEU if the resources required for the operation are not in conflict. If a register or an operand being updated by FEUs is used for an address generation by the given instruction, then the instruction is held until the conflict is resolved. However, if there is a conflict of a register which is being updated by the previous FEU instruction, or if there is a data destined to memory which is updated by the previous FEU instruction, then the command is issued to the FEU. This is possible because the updated register or data can be reused by a short path through the result bus, i.e., any result register can be used as a source to some other FEU. The source and destination controls issued by this unit are used to accomplish this operation.
3. Issues controls to FEUs.
   Source and destination controls are generated by the IDISP unit and issued to the FEUs.
4. Issues address generation to AGEN unit.
   The IDISP unit can issue an address generation for a given instruction after the conflict is resolved.
5. Keeps track of all the resources.
   The IDISP unit keeps track of the usage of registers for each instruction in process, operand addresses required for each instruction in process, update of each register by the FEU, and update of memory locations by each FEU for the instructions in process.

Figure 10:
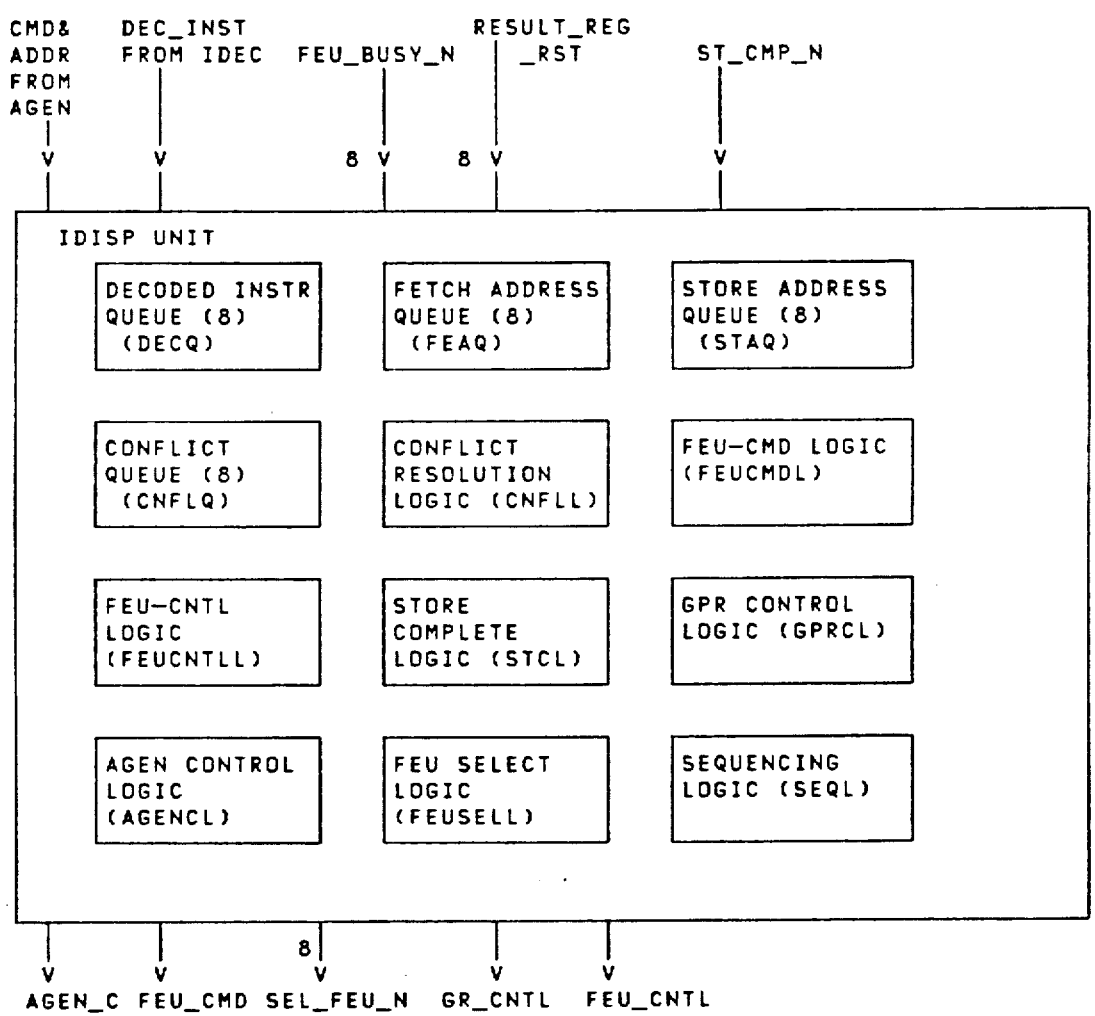
FIG. 10 is a schematic diagram of the dispatcher.

The instruction dispatcher unit shown in greater detail in FIG. 10, performs all the synchronizing functions in the CPU. It receives a decoded instruction from IDEC and address generated and command from AGEN. The IDISP keeps the decoded instructions in queue (DECQ), and addresses generated in queue (FEAQ or STAQ). The command from AGEN indicates the type of address sent to IDISP and the status of the command. The interface between IDISP and AGEN is strictly an address communication type, and the interface between IDEC and IDISP is only for decoded instructions.

The decoded instruction is used by the IDISP to generate a FEU command depending upon the type of the op code. This mapping is done by using a table lookup of the instruction map table shown in FIG. 13 through FIG. 22. This table also contains other information like: OPD1, OPD2, RESULT, etc. These table entries are in a read only store (ROS) in or associated with the FEU_CNTL logic of the IDISP, which is read to obtain the static OPD1, OPD2 and RESULT IDs. These values may have to be modified later by the FEU_CMD logic if the operands are wrapped around from a result register or a storage buffer.

FEAQ, STAQ of FIG. 10 are the fetch and store addresses generated by AGEN which are kept in the queue until the operation is complete. At any given time there can be only a maximum of eight instructions floating around in the system. All the queues are eight deep to cover a maximum of eight instructions. Also, there are eight FEUs architected for the CPU and thus they correspond to the eight instruction status maintained in IDISP.

Conflicts are checked for fetch and store addresses in the IDISP. If there is a fetch address conflict, the address being already fetched for a previous instruction, the IDISP provides proper OPD ID to the FEU units to use the appropriate result register. Store address is again used to resolve conflicts. If there is a store address conflict, the address being already set up for destination to memory is re-routed to appropriate operand registers by coding a proper OPD ID.

If there are register conflicts, IDISP resolves the conflicts and codes an appropriate ID in the OPD ID field to the FEU. GPR control logic of FIG. 10 generates the appropriate gates to the GPR file and provides the GPR address to the FEUs. GR_CNTL output from the IDISP consists of the address and control to GPR file.

FEU_CMD logic of FIG. 10 triggers with FEU_BUSY_N line from the FEUs. FEU_CMD logic issues command to a particular FEU upon receipt of instruction from IDEC and command from AGEN. If the FEU_BUSY_N for the FEU is on, the command is delayed until the FEU becomes available.

FEU_CNTL logic of FIG. 10 triggers with FEU_BUSY_N line from the FEUs. FEU_CNTL logic issues controls to a particular FEU upon receipt of instruction from IDEC and command from AGEN. If the FEU_BUSY_N for the FEU is on, the control is delayed until the FEU becomes available.

ST_CMP_N from the store buffer logic of FIG. 1 indicates that a particular slot in the store buffer completed a store to memory. This signal can reset a store address in STAQ of FIG. 10 so that IDISP does not have to check this address for store address conflicts.

RESULT_REG_RST lines to IDISP indicates that the particular result register is reset, the conflict logic for the result register can be reset in the IDISP. For example, there may be an instruction using a previous instruction's results, and the flag is set for that instruction which can be reset. Also the future instructions do not have to refer to that result register if they need result register as an operand.

FEU select logic of FIG. 10 controls the select lines to FEUs, FEU controls. This line is gated only if that FEU is not busy.

AGEN control of FIG. 10 is used to regenerate addresses, receive and send status of an instruction.

Sequencing logic (SEQL) of FIG. 10 controls the eight instructions, their order of arrival, conflict resolution, and next FEU command and control.

Operand Registers (OPD REG)

Operand registers of FIG. 1 are used to buffer the operand data for the FEUs. There are two operand registers required in front of each FEU. The operand registers can be loaded by the following sources:

Data from memory (MEM_BUS)
Immediate data from AGEN (IMMED_DATA)
Data from general registers (GR_BUS_A or GR_BUS_B)
Data from storage buffers (STORE_BUS)
Data from the result registers (RESULT_BUS)

SRC1SEL AND SRC2SEL control lines from the FEU$_{13}$ CMD are used to select one of the above five sources to gate into the operand register.

Functional Execution Unit (FEU)

Functional execution units of FIG. 1 are the execution elements. and execute particular type of functions. The FEU architecture for the specific embodiment disclosed. has the following separate and distinct FEU functions:

1. Loads
2. Stores
3. Add, Sub, Compare fixed point
4. Add, Sub, Compare floating point
5. Bit set/rest, Shifts, Logical
6. Multiply
7. Divide
8. Branches, I/O and miscellaneous The selection of this particular combination of eight functional execution units is based on the percentage mix of instructions in a particular signal processing application. However, other combinations of FEU functions and other group sizes than the eight in this embodiment, can be selected for other CPU applications.

Each FEU receives a FEU$_{13}$ CMD from the IDISP unit. It waits for the operands to arrive in the operand registers. Once the operands arrive. the FEU checks for the valid bits (OPD_REG1_V and OPD_REG2_V) and then starts the operation. The execution of the function in the FEU can take multiple cycles. When the FEU operation is done the results are loaded into the FEU's result register and the valid bit in the result register (RESULT_V_N) is set to one and the valid bits of the operand registers are reset. Now, the FEU is ready for the next operation.

Each FEU has independent operand and result registers and the commands are directed to the FEU by the IDISP unit. Thus several of the FEUs can run in parallel and in an out-of-sequence order if the instructions have no conflict.

Result Registers (RESULT REG)

There is one result register for each FEU in FIG. 1, and the result registers' valid bit is set after the operation is complete by the FEU. This result register can be destined to any other source register through the RESULT_BUS and FEU control mechanism. The result register valid bit is reset when the usage of the register is complete. The FEU cannot load the result into the register until the valid bit is reset. This guarantees that the previous result is destined before the new result is generated.

Register File (REG FILE)

There are 16 general purpose registers in the register file in FIG. 1 for the disclosed architecture. These registers are independently addressable and there are a one read and two write ports. The registers are addressable only by the source control and destination control logic. IDISP and AGEN units can issue GR_CNTL to read or write into the register file. The GR_CNTL consists of address lines and r/w controls.

Storage Buffer (STORE BUF)

The storage buffer in FIG. 1 is a store data queue destined to memory. In order to accommodate slow memories and also to handle multiple FEU stores simultaneously, an eight deep queue is provided as a buffer. The data is stored in this queue. and the addresses are maintained by the IDISP unit. Storage buffer data can also be destined to source registers and memory simultaneously so that an existing operand local to the processor does not have to be fetched from memory. The IDISP unit has to compare these locations for address conflicts they might have in the current instruction stream.

FEU Interface

FIG. 2 is an illustration of the FEU interface in more detail.

The FEU command consists of a CMD field and SRC1SEL, SRC2SEL fields. The CMD field indicates the different formats of the instruction for a given FEU type. For example, load FEU may be getting a variety of load instructions to be executed by the FEU. The FEU decode logic is a very simple logic as it has to recognize only a few operations. In addition to the CMD there is a select line from IDISP to each FEU which selects the FEU for the command. This command is only valid for one cycle so that the IDISP can issue commands every cycle, the FEUs have to latch the command internally.

The gating to the operand registers is controlled by the source and destination control logic as described in the FEU control section.

The FEU starts execution when the operand registers required are valid and turn off the valid bits after usage. When the operation is complete the result register is loaded by the corresponding FEU and the valid bit is turned on. The result register valid bit is turned off by the source and destination control logic after the usage of the result register.

FEU$_{13}$ CMD consists of a CMD,SRC1SEL,SRC2SEL fields. CMD indicates the FEU unit command which is appropriate to the corresponding FEU. SRC1SEL and SRC2SEL are the operand register input mux selects which will enable the mux inputs. The following codes are used for mux selects:

SRC1SEL
1. GR_BUS_A
2. DATA_BUS
3. STORE_BUS
4. RESULT_BUS
5. IMMEDIATE DATA

SRC2SEL
1. GR_BUS_B
2. DATA_BUS
3. STORE_BUS
4. RESULT_BUS
5. IMMEDIATE DATA

FEU Control

FIG. 3 is an illustration of the FEU control logic. FEU control logic controls the gating for the source and destination resources of the FEU facilities. There are 16 operand registers, 16 general purpose registers, eight storage buffers, memory, AGEN units making use of the resources. The following IDs are allocated for the sources and destination fields:

1. operand register 1, used in FEU1
2. operand register 2, used in FEU1
3. operand register 3, used in FEU2
4. operand register 4, used in FEU2
5. operand register 5, used in FEU3

-continued 6. operand register 6, used in FEU3
7. operand register 7, used in FEU4
8. operand register 8, used in FEU4
9. operand register 9, used in FEU5
10. operand register 10, used in FEU5
11. operand register 11, used in FEU6
12. operand register 12, used in FEU6
13. operand register 13, used in FEU7
14. operand register 14, used in FEU7
15. operand register 15, used in FEU8
16. operand register 16, used in FEU8
17. register file
18. AGEN unit
19. storage buffer 1
20. storage buffer 2
21. storage buffer 3
22. storage buffer 4
23. storage buffer 5
24. storage buffer 6
25. storage buffer 7
26. storage buffer 8
27. result register 1
28. result register 2
29. result register 3
30. result register 4
31. result register 5
32. result register 6
33. result register 7
34. result register 8
35. immediate data
36. from memory
37. to memory
38. I/O facilities
39. "
40. "
41. "
42. "
43. "
44. "
45. "
46. "
47. "
48. Status registers
49. Load multiples
50. POPM
51. PSHM FEU CNTL logic in FIG. 3 is a single control unit which controls all the FEUs. It receives ID, FEU select line from the IDISP unit and individual RESULT_V_N lines from each FEU. It receives GR_CNTL from AGEN unit so that a general purpose register can be accessed by AGEN. It also receives GR_CNTL lines from IDISP unit so that a source operand register can be loaded into a given FEU. The controls from IDISP are valid for only one cycle. The FEUs have to latch the IDs and controls if needed later. FEU CNTL logic saves all the controls received from IDISP unit and FEUs and provides control to the result bus, gating to the source registers (operand regs), gating to register file, and gating to the storage registers.

FEU CNTL logic resets the RESULT_V_N lines after the result register has been gated to an appropriate destination. This logic also controls RESULT_BUS to appropriately gate the result registers on the bus.

The IDs (OPD1_ID,OPD2_ID,RESULT_ID) are six bit IDs used to indicate the source or a destination required for the instruction. OPD1_ID indicates the source of operand 1 (where it is coming from), OPD2_ID indicates the source of operand 2 (where it is coming from), and the RESULT_ID indicates the result of the operation (where it is destined for storage). If an operand is coming from a previous operation of the result register this will be indicated in the OPD1_ID or OPD2_ID as appropriate. If an operand is coming from memory it is indicated in the OPD1_ID or OPD2_ID as appropriate and so on. The control logic keeps track of each operand status for every FEU and provides the gating controls, bus selects, and reset controls to the result registers. This centralized mechanism is necessary to achieve the multiple FEUs execution in parallel without knowing what the other FEUs are doing.

This control also provides an asynchronous operation of IDISP and FEUs by providing a synchronization. After the end of each FEU operation the valid bit is set by the FEU and the control logic resets the valid bit and indicates to the IDISP which FEU completed the operation. This provides synchronization at the IDISP unit which can keep track of the source and destination IDs.

FEU Source and Result Select Logic

Figure 11:
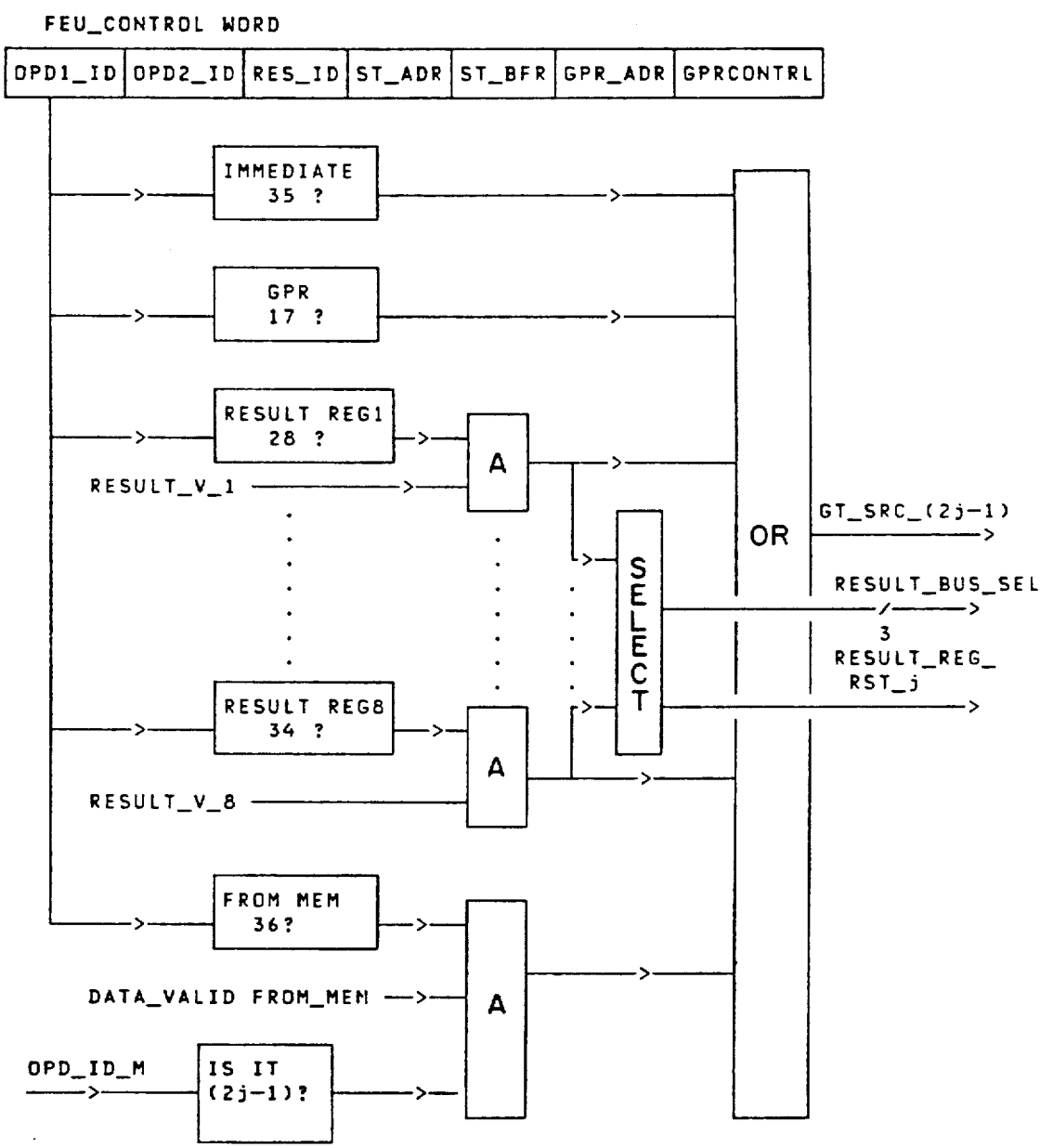
FIG. 11 is a schematic diagram of the source and result select logic.

Refer to FIG. 11 for the detailed description of the FEU source and result select controls. For $j=1$ the GT_SRC_$(2j-1)$ line becomes GT_SRC_1 and RESULT_REG_RST_$j$ becomes RESULT_REG_RST_1. The OPD1_ID field of the FEU_CONTROL WORD is scanned to see if it is an immediate operand (code 35) or a GPR data (code 17) in which case the GT_SRC_1 is activated immediately. If the OPD1_ID specifies RESULT_REG1 (codes 28) then GT_SRC_1 is activated when the RESULT_V_1 is active. The same logic is extended to codes 29 through 34.

If the OPD1_ID field specifies that the operand is coming from storage (code 36) then GT_SRC_1 is activated when the data valid from memory is active and the OPD_1_M is equal to $(2j-1)$ which is 1 in this case. The same is true for OPD2_ID field except the GT_SRC$(2j-1)$ becomes GT_SRC$(2j)$.

FEU Store Buffer Select Logic

Figure 12:
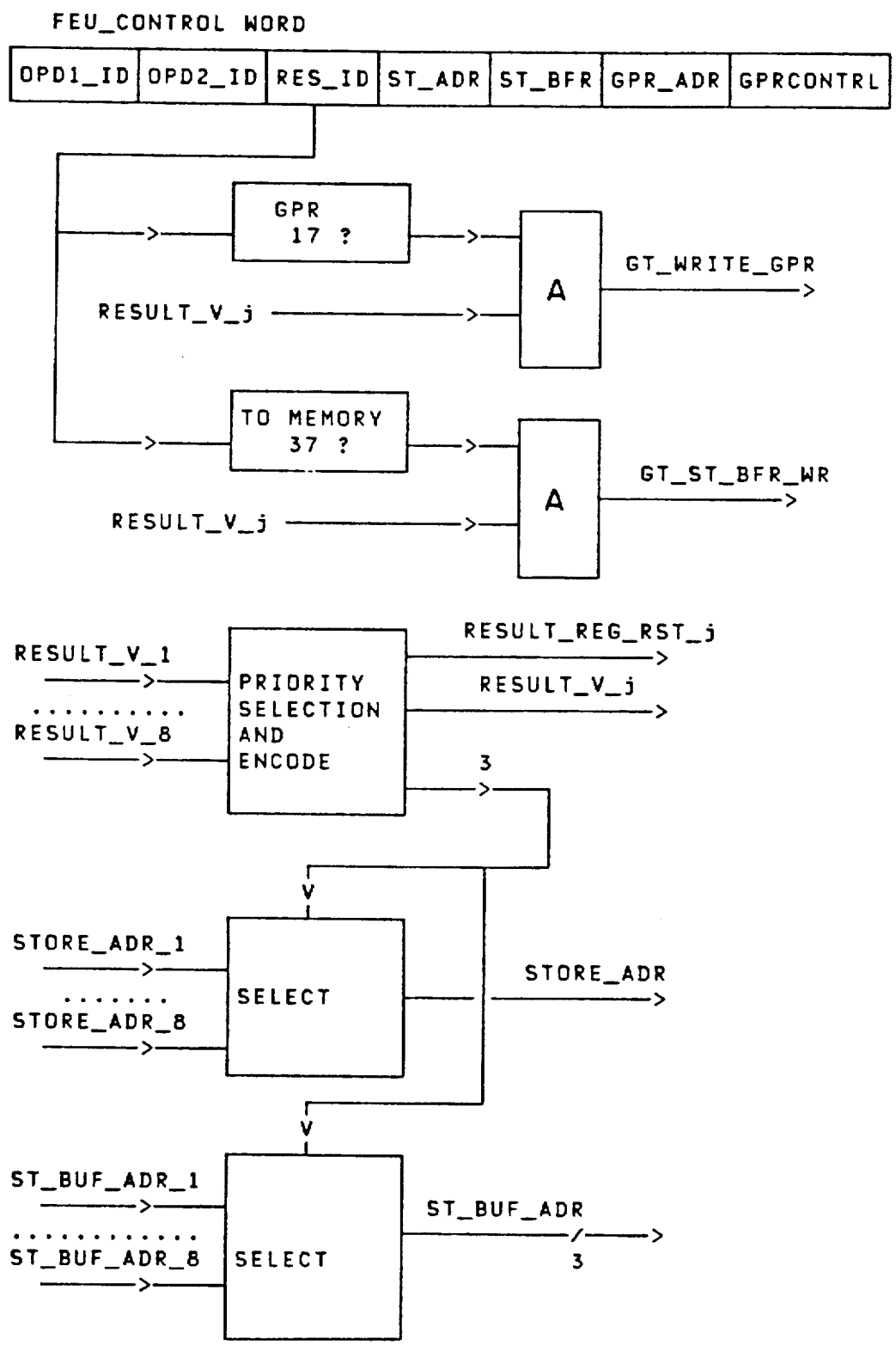
FIG. 12 is a schematic diagram of the store buffer select logic.

Refer to FIG. 12 for the detailed description of the FEU store buffer select controls. The priority select mechanism selects a RESULT_REG_J for put away. If the RES_ID field of the FEU_CONTROL_WORD is 17 and the RESULT_V_J is active, then GT_WRITE_GPR is activated. But if it is 37 and the RESULT_V_J is active then GT_ST_BFR_WR is activated appropriately gating the STORE_ADR_J and ST_BUF_ADR_J onto the STORE_ADR and ST_BUF_ADR buses.

EXAMPLE 1

Description

To illustrate the concept of the FEU architecture, we have taken a small sequence of four instructions for execution to show the timing and usage of multiple FEUs:

1. SB 5,#2000; Set bit 5 in the operand in storage at address 2000.
2. L 1,#4000;Load register 1 from storage address 4000.
3. AR 1,2; Add register 1 and 2 and result back to 1.
4. MR 4,6; Multiply register 4 and 6 and result to 4 and 5.

The four instructions described above are decoded by the IDEC unit and AGEN generates the address for the operands. IDISP unit in parallel with the AGEN unit further decoded the instructions to dispatch to FEUs. IDISP unit also resolves all the conflicts available in the instructions. IDISP unit forms a FEU_CNTL for each instruction and sends it to source and destination control logic (SDCNTL).

The FEU_CNTL for the given example are coded by the IDISP as shown in FIG. 4.

Figure 5:
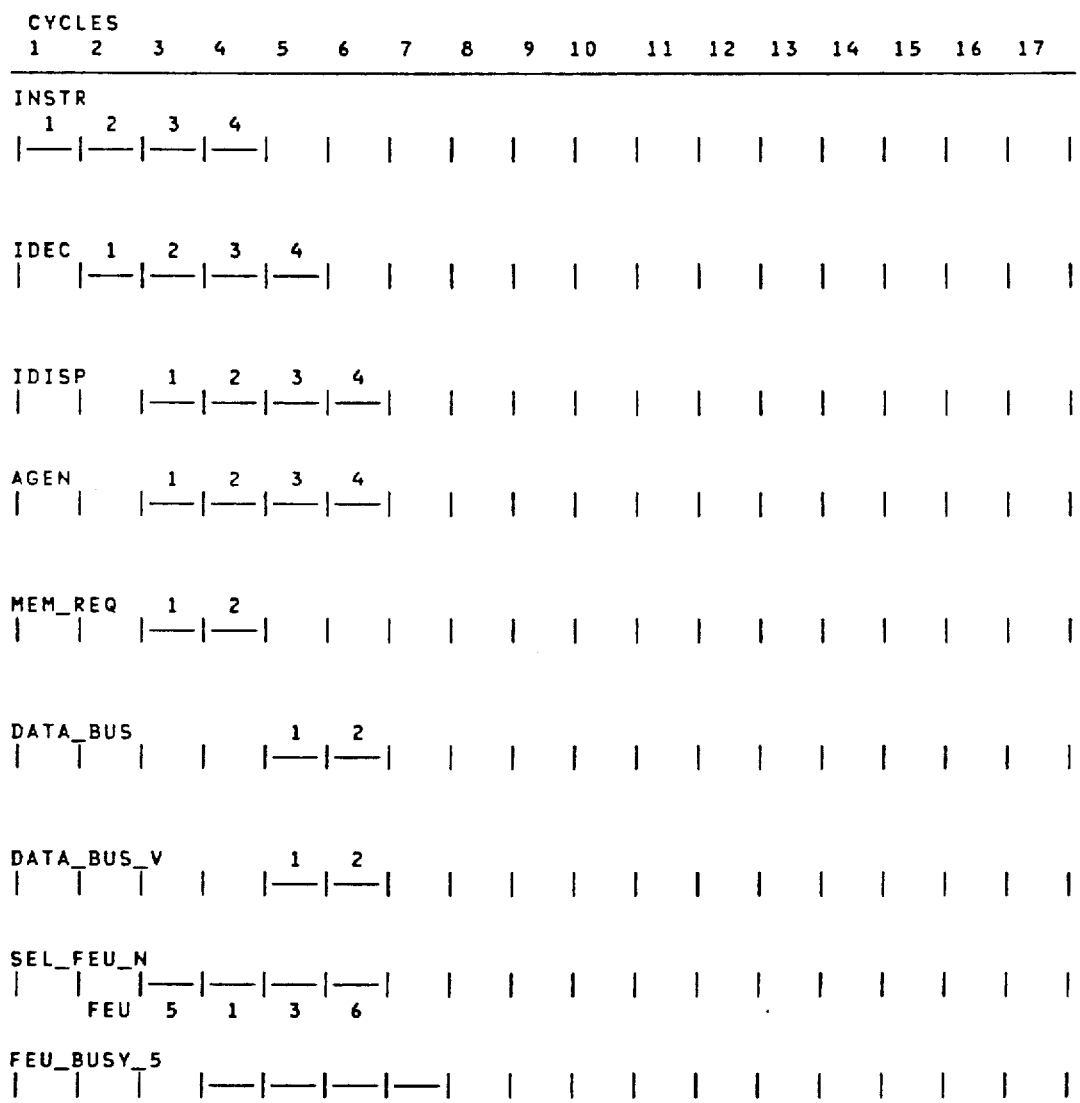
FIG. 5 is a timing diagram of an example of the operation of the execution unit FEU5.

A step-by-step description of the operation, looking from FEU5, is as follows (refer to the timing diagrams of FIGS. 5 and 6):

1. Instruction 1 is fetched from instruction store.
2. Instruction 1 is decoded. Also the GRs are accessed.
   Address generation done for operand fetch by AGEN logic.
   Storage request to forward the data of LOC 2000 to FEU5 is issued.
   IDISP sends the command vector to FEU5 command register.
   The control vector 35 36 37 2000 is generated by IDISP and sent to FEU_CNTL logic.
   FEU_SEL_N is set to 5 to select FEU5.
   1st operand which is 5 is buffered in IMM_DATA_REG.
3. The control vector 35 36 37 2000 is deposited into FEU_CW_5.
4. FEU5 set a FEU_BUSY_5 latch to indicate he is busy.
5. FEU control logic generates the GT_SRC_9 signal and FEU5 command register select the immediate data so the data 5 is gated to OPD_REG9.
6. OPD_REG9_V is set indicating the operand is valid.
7. The FEU_CW_5 has a code 36 indicating 2nd operand is due from storage and generates the GT_SRC_10 line when the data from storage is valid and is destined to FEU5.
8. OPD_REG_10 valid is set.
9. FEU5 fires seeing both operands valid.
10. Result reg valid is set and operand valids are reset.
11. FEU_CW_5 generate the GT_ST_BFR_WR and stores the concatenated contents of storage address 2000 and result reg data into the store buffer, resets the result valid and frees the FEU5 by resetting it busy bit.

Figure 7:
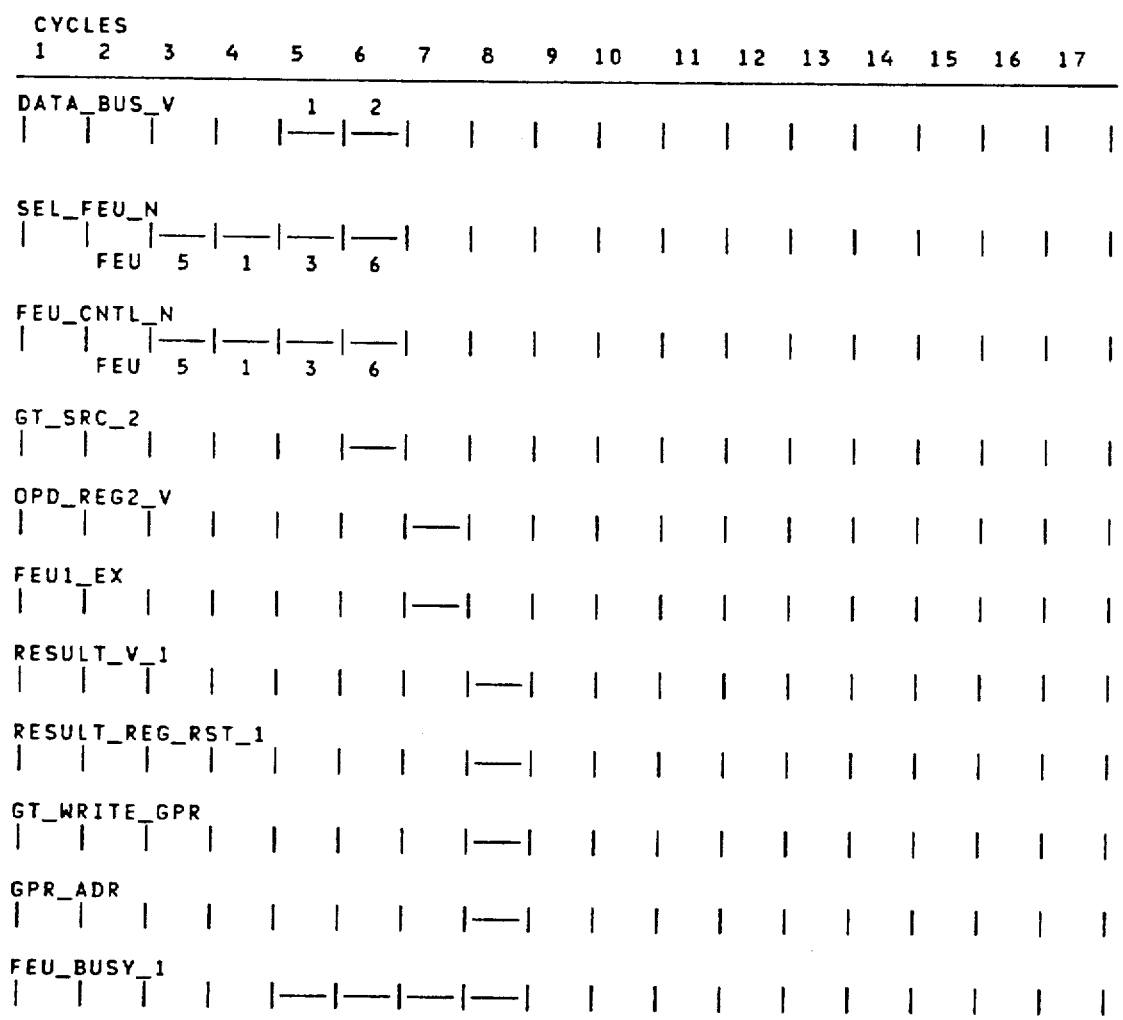
FIG. 7 is a timing diagram for the execution unit FEU1 in the example.

A step-by-step description of the operation, looking from FEU1, is as follows (refer to the timing diagram of FIG. 7):

1. Instruction 2 is fetched from instruction store.
2. Instruction 2 is decoded. Also the GRs are accessed.
   Address generation done for operand fetch by AGEN logic.
   Storage request to forward the data of LOC 4000 to FEU1 is issued.
   IDISP sends the command vector to FEU1 command register.
   The control vector 17 36 17 4000 is generated by IDISP and sent to FEU_CNTL logic.
   FEU_SEL_N is set to 1 to select FEU1.
   GR file accessed for GR1 data.
3. The control vector 17 36 17 4000 is deposited into FEU_CW_1.
4. FEU1 sets FEU_BUSY_1 latch to indicate he is busy.
5. FEU control logic generates the GT_SRC_1 signal and FEU1 command register selects the GR_BUS_A gating the GR1 contents to OPD_REG1.
6. OPD_REG1_V is set indicating the operand is valid.

7. The FEU_CW_1 has a code 36 indicating 2nd operand is due from storage and generates the GT_SRC_2 line when the data from storage is valid and is destined to FEU1.
8. OPD_REG_2 valid is set.
9. FEU1 fires seeing both operands valid.
10. Result reg valid is set and operand valids are reset.
11. FEU_CW_1 resets the RESULT_V_1, discovers GR1 is due to be written by a successor instruction making the present write a redundant one and hence cancels the present write and resets FEU_BUSY_1.

Figure 8:
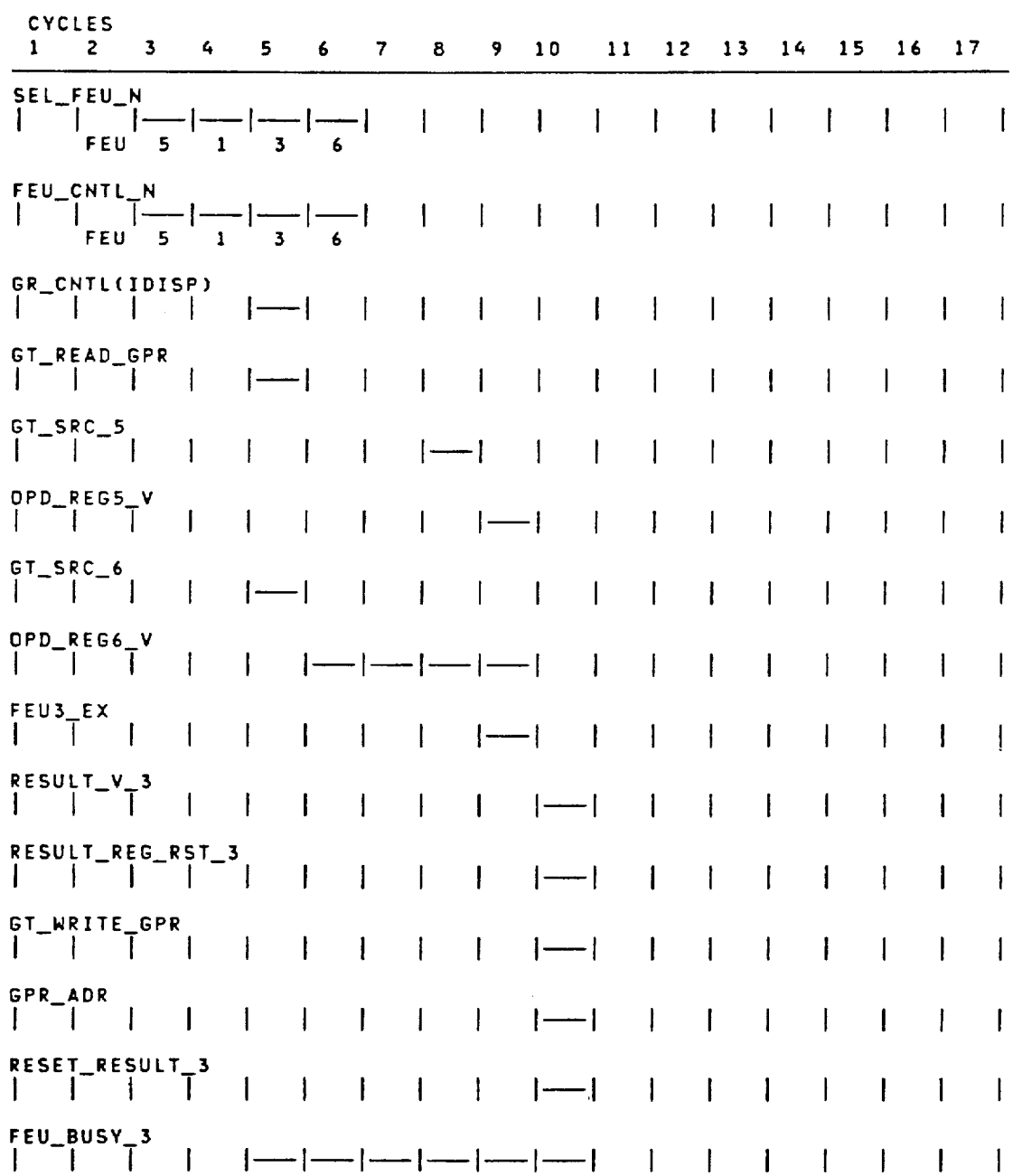
FIG. 8 is a timing diagram of the execution unit FEU3 in the example.

A step-by-step description of the operation, looking from FEU3, is as follows (refer to the timing diagram of FIG. 8):

1. Instruction 3 is fetched from instruction store.
2. Instruction 3 is decoded. Also the GRs are accessed.
   Address generation done for operand fetch by AGEN logic.
   No storage request for this instruction.
   IDISP sends the command vector to FEU3 command register.
   The control vector 27 17 17 FFFF is generated by IDISP and sent to FEU_CNTL logic.
   FEU_SEL_N is set to 3 to select FEU3.
   GR file accessed for operands.
3. The control vector 27 17 17 FFFF is deposited into FEU_CW_3.
4. FEU3 sets FEU_BUSY_3 latch to indicate he is busy.
5. FEU3 command selects RESULT BUS for operand 1 and GR_BUS_B for operand 2.
6. FEU control logic finds from code 27 that OPD1 is due from RESULT_REG 1 and monitors RESULT_V_1 to generate GT_SRC_5.
7. OPD_REG6_V is set indicating the operand is valid.
8. The FEU_CW_3 has a code 17 indicating 2nd operand is due from GPRs and generates the GT_SRC_6 line immediately.
9. OPD_REG6_V is set.
10. FEU3 waits for OPD_REG5_V.
11. GT_SRC_5 comes on in cycle 8 and sets OPD_REG5_V.
12. FEU3 fires.
13. Result reg valid is set and operand valids are reset.
14. FEU_CW_3 generates the GT_WRITE_GPR and stores the RESULT_REG_3 into GR1, resets the RESULT_V_3, frees FEU3 by resetting its busy bit.

Figure 9:
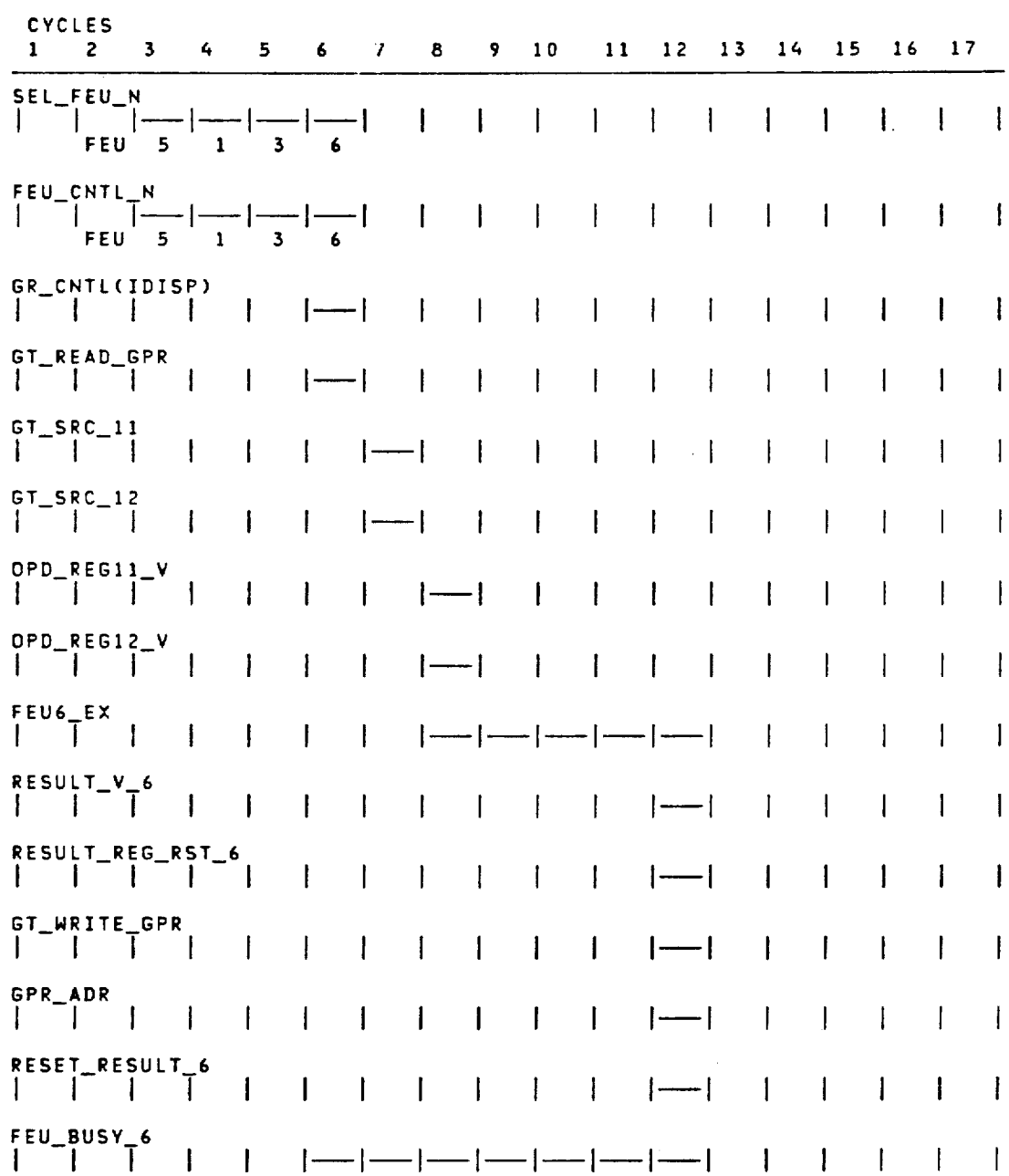
FIG. 9 is a timing diagram of the execution unit FEU6 in the example.

A step-by-step description of the operation, looking from FEU6, is as follows (refer to the timing diagram of FIG. 9):

1. Instruction 4 is fetched from instruction store.
2. Instruction 4 is decoded. Also the GRs are accessed.
   Address generation done for operand fetch by AGEN logic.
   No storage request is necessary.
   IDISP sends the command vector to FEU6 command register.
   The control vector 17 17 17 FFFF is generated by IDISP and sent to FEU_CNTL logic.
   FEU_SEL_N is set to 6 to select FEU6.
   GPRs accessed.
3. The control vector 17 17 17 FFFF is deposited into FEU_CW_6.

4. FEU6 sets FEU_BUSY_6 latch to indicate he is busy.
5. FEU6 command vector selects GR_BUS_A for opd 1 and GR_BUS_B for opd 2.
6. FEU control logic generates the GT_SRC_11 and GT_SRC_12 signals.
7. OPD_REG11_V is set indicating the operand is valid.
8. OPD_REG12_V is set indicating the operand 2 is also ready.
9. FEU6 fires seeing both operands valid.
10. Takes 5 cycles to execute.
11. Result reg valid is set on last execution cycle and OPD_REG11_V and OPD_REG12_V reset.
12. FEU_CW_6 generates the GT_WRITE_GPR, resets the result valid and frees the FEU6 by resetting its busy bit.

It can be seen that the resulting data processor enables the selective simultaneous or asynchronous execution of mutually independent instructions of different classes in parallel coupled execution units and yet also enables the sequential execution of mutually dependent instructions of different classes by delaying the execution of a dependent instruction in a second execution unit until the completion of execution of a precursor instruction in a first execution unit.

Although a specific embodiment of the invention has been disclosed, it will be understood by those having skill in the art that minor changes can be made to the disclosed embodiments without departing from the spirit and the scope of the

What is claimed is:

1. In a data processing system including a plurality of functional execution units processing a sequence of instructions from an input instruction stream, said instructions including a command, an operand source reference and a result location reference, an improvement for selectively processing said instructions in series or in parallel, comprising:

a first functional execution unit having a control input and an operand input and having a result output connected to an execution result bus and a result-valid signal output, for executing a first class of said instructions having a first type command operating on a first operand received at said operand input;

a second functional execution unit having an input multiplexor comprising a control input, a first data input connected to said execution result bus, a second data input connected to an alternate data source, and a data output, said second functional execution unit further comprising an input gate having a data input connected to the output of said multiplexor, said input gate having a data output and a control input for selectively passing data from the output of said multiplexor to the output of said input gate, said second functional unit further comprising an execution portion having an operand input connected to the output of said input gate and a result output, for executing a second class of said instructions having a second type command operating on a second operand received at said operand input;

a dispatcher having an instruction input coupled to said input instruction stream, for receiving at least a first occurring instruction having said first type command and a second occurring instruction having said second type command therefrom, said dispatcher having a first control output connected to said first functional execution unit, a second control output connected to said second functional execution unit and a third control output, said dispatcher including means to identify the command type for each instruction and in response to a determination of command type, to control said first execution unit to execute said first occurring instruction and to control said second execution unit to execute said occurring second instruction;

a control unit having a first control input connected to said third control output of said dispatcher and a second control input coupled to said result-valid signal output of said first functional execution unit, and a control output coupled to said control input of said input gate of said second functional execution unit for selectively passing data, said control unit having a control word register connected to said first execution unit for storing a modified result-destination location value;

said dispatcher including means for comparing said result location reference of said first occurring instruction with said operand source reference of said second occurring instruction to determine whether execution of said second occurring instruction depends on a result obtained by execution of said occurring first instruction;

said dispatcher, in response to determining that execution of said second occurring instruction depends on a result obtained by execution of said occurring first instruction, outputting a first multiplexor control signal to said multiplexor of said second functional unit to connect said execution result bus to a data output thereof and outputting said third control output to said control unit to designate said second functional execution unit as said modified result-destination location in said control word register, said first functional execution unit outputting a result-valid signal to said control unit when said result is output therefrom to said execution result bus, said control unit in response to said result-valid signal outputting a control signal to said control input of said input gate of said second functional execution unit, for passing said result output from said first functional execution unit onto said execution result bus, as said second operand for said second functional execution unit;

said dispatcher, in response to determining that execution of said second occurring instruction does not depend on a result obtained by execution of said first occurring instruction, outputting a second multiplexor control signal to said multiplexor of said second functional unit to connect said alternate data source to a data output thereof and outputting said third control signal to said control unit to control said second functional execution unit to execute said second occurring instruction when said alternate data source provides said second operand thereto, in parallel with said first functional execution unit executing said first occurring instruction;

whereby said instructions are selectively processed in series or in parallel, in an efficient manner.

2. The system of claim 1, wherein said first class of said instructions is for loading general purpose registers coupled to said execution units in said system and said second class of said instructions is for accessing a memory coupled to said execution units in said system.

3. The system of claim 1, wherein said first class of said instructions is for executing arithmetic functions and said second class of said instructions is for accessing a memory coupled to said execution units in said system.

4. The system of claim 1, wherein said first class of said instructions is for executing fixed point arithmetic functions and said second class of said instructions is for executing floating point arithmetic functions.

5. The system of claim 1, wherein said first class of said instructions is for executing arithmetic functions and said second class of said instructions is for performing branching operations.

6. The system of claim 1, wherein said first class of said instructions is for performing branching operations and said second class of said instructions is for accessing a memory coupled to said execution units in said system.

7. In a data processing system including a plurality of functional execution units processing a sequence of instructions from an input instruction stream, said instructions including a command, an operand source reference and a result location reference, an improvement for selectively processing said instructions in series or in parallel, comprising:

a first functional execution unit having a control input and an operand input and having a result output connected to a result bus and a result-valid signal output, for executing a first instruction operating on a first operand received at said operand input;

a second functional execution unit having an input multiplexor comprising a control input, a first data input connected to said result bus, a second data input connected to an alternate data source, and a data output, said second functional execution unit further comprising an input gate having a data input connected to the output of said multiplexor, said input gate having a data output and a control input for selectively passing data from the output of said multiplexor to said gate output, said second functional unit further comprising an execution portion having an operand input connected to said gate output and a result output, for executing a second instruction operating on a second operand received at said operand input;

a dispatcher having an instruction input coupled to said input instruction stream, for receiving at least a first occurring instruction and a second occurring instruction therefrom, said dispatcher having a first control output connected to said first functional execution unit, a second control output connected to said second functional execution unit and a third control output, said dispatcher including means to control said first execution unit to execute said first occurring instruction and to control said second execution unit to execute said second occurring instruction;

a control unit having a first control input connected to said third control output of said dispatcher and a second control input coupled to said result-valid signal output of said first functional execution unit, and a control output coupled to said control input of said input gate of said second functional execution unit, said control unit having a control word register connected to said first execution unit for storing a modified result-destination location value;

said dispatcher including means for comparing said result location reference of said first occurring instruction with said operand source reference of said second occurring instruction to determine whether execution of said second occurring instruction depends on a result obtained by execution of said first occurring instruction;

said dispatcher, in response to determining that execution of said second occurring instruction depends on a result obtained by execution of said first occurring instruction, outputting a first multiplexor control signal to said multiplexor of said second functional unit to connect said result bus to a data output thereof and outputting said third control output to said control unit to designate said second functional execution unit as said modified result-destination location in said control word register, said first functional execution unit outputting a result-valid signal to said control unit when said result is output therefrom to said result bus, said control unit in response to said result-valid signal outputting a control signal to said control input of said input gate of said second functional execution unit, for passing said result output from said first functional execution unit onto said result bus, as said second operand for said second functional execution unit;

said dispatcher, in response to determining that execution of said second occurring instruction does not depend on a result obtained by execution of said first occurring instruction, outputting a second multiplexor control signal to said multiplexor of said second functional unit to connect said alternate data source to a data output thereof and outputting said third control signal to said control unit to control said second functional execution unit to execute said second occurring instruction when said alternate data source provides said second operand thereto, in parallel with said first functional execution unit executing said first occurring instruction;

whereby said instructions are selectively processed in series or in parallel, in an efficient manner.

* * * * *

UNITED STATES PATENT AND TRADEMARK OFFICE
CERTIFICATE OF CORRECTION

PATENT NO. : 5,133,077

DATED : 7/21/92

INVENTOR(S) : Ramesh K. Karne, et al.

It is certified that error appears in the above-identified patent and that said Letters Patent is hereby corrected as shown below:

On the title page, item [54] and in column 1, lines 1-3:
Please correct the title of the patent to read as follows:

--DATA PROCESSOR HAVING MULTIPLE EXECUTION UNITS FOR PROCESSING
   PLURAL CLASSES OF INSTRUCTIONS IN PARALLEL--

The word "CLASS" should be plural.  This is a Patent Office mistake.

Signed and Sealed this

Seventh Day of September, 1993

Attest:

BRUCE LEHMAN

*Attesting Officer*          *Commissioner of Patents and Trademarks*